Oct. 8, 1940.   A. M. TIMPE   2,217,032
SHUTTLECOCK
Filed April 22, 1939
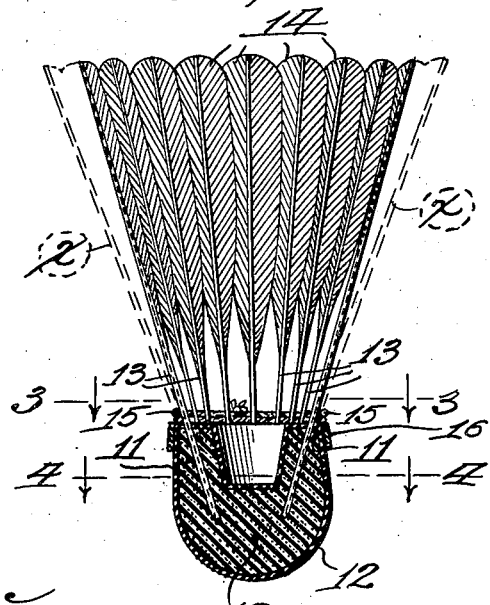
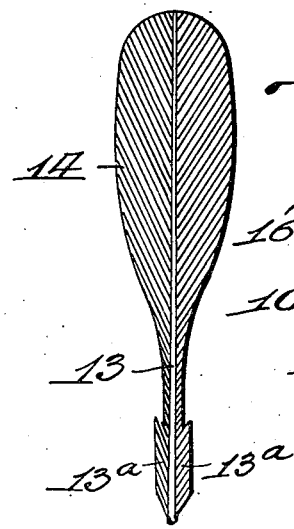
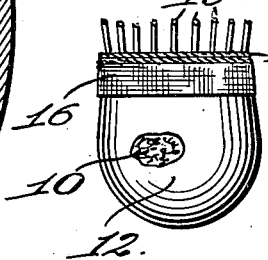
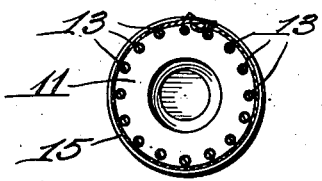
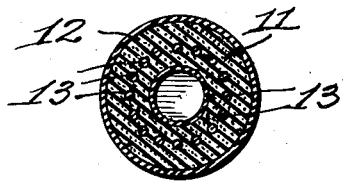
INVENTOR
ATWOOD M. TIMPE
BY Martin  Smith ATTY.

Patented Oct. 8, 1940

2,217,032

UNITED STATES PATENT OFFICE 2,217,032

SHUTTLECOCK

Atwood M. Timpé, Los Angeles, Calif.

Application April 22, 1939, Serial No. 269,448

8 Claims. (Cl. 273—106)

My invention relates to a shuttlecock or as they are generally termed, a "bird" and used in the playing of games, such as badminton, battledore, shuttlecock, and the like, wherein the so-called bird is struck by rackets manipulated by the contending players of the games.

Shuttlecocks or birds of the type to which my invention relates should, in order to give satisfactory results, combine lightness of weight with liveliness and, at the same time the construction of the bird should be such as to resist to the greatest possible degree the relatively hard treatment to which it is subjected during play, for instance, the impact of the racket and as frequently occurs, the effects produced as a result of the bird being stepped upon by the players during the game.

The principal objects of my invention are, to generally improve upon and simplify the construction of the existing forms of shuttlecocks or birds, to construct the body of the bird from elastic material, such as sponge rubber, so that it will instantly return to its normal condition after being distorted by undue pressure, for instance, the force of the blows of the racket or the weight of a person's body in the event that the bird after falling to the ground or floor is stepped upon by a player and further, to provide an improved arrangement and means for anchoring the feathers in the elastic body of the bird.

A further object of my invention is, to provide a bird having a body formed of elastic material such as sponge rubber, in which portions of the quills of the feathers are embedded and, to provide simple and efficient means, preferably a flexible tie that passes around the entire series of feathers immediately adjacent the rear end of the body of the bird and which tie is drawn taut before being secured, in order to create and maintain in that portion of the elastic body in which the feathers are embedded a considerable degree of compression strains that counteract the tendency of the projecting portions of the feathers and that portion of the body in which they are embedded, to expand and return to their normal positions, which condition imparts to the bird an increased degree of liveliness which is effective in bringing about "faster" play during the game.

A further object of my invention is, to mount the feathers upon the body and connect the quill portions of said feathers to each other so as to minimize, insofar as possible, the resistance offered by the air during the flight or travel of the bird after the same has been struck by the racket, so that the desirable attribute of "carry" is imparted to the bird.

Further objects of my invention are, to provide a bird of sturdy, substantial construction, thereby insuring comparatively long playing life and further, to provide a bird of simplified construction, capable of being readily repaired in the event of feather breakage, and which may be manufactured at a reasonable cost.

With the foregoing and other objects in view, my invention consists in certain novel features of construction and arrangement of parts that will be hereinafter more fully described and claimed and illustrated in the accompanying drawing in which:

Fig. 1 is a vertical section taken through the center of a shuttlecock or bird constructed in accordance with my invention.

Fig. 2 is an elevational view of one of the feathers utilized in the construction of the bird.

Fig. 3 is a horizontal section taken on the line 3—3 of Fig. 1.

Fig. 4 is a horizontal section taken on the line 4—4 of Fig. 1.

Fig. 5 is an elevational view of the body of the shuttlecock.

Referring by numerals to the accompanying drawing which illustrates a preferred embodiment of my invention, 10 designates a substantially hemi-spherical body of pure gum sponge rubber and, formed integral with the marginal portion of said body is a circular wall 11 also formed from sponge rubber. In order to give the body of the bird a finished and attractive appearance, I prefer to encase said body including the wall 11 with an integral thin "skin" or layer 12 of pure gum rubber.

Thus the elastic body of the bird has the general shape of a cup with a rounded forward or lower end. Embedded in the wall 11 are the ends of the quill portions 13 of the feathers 14 forming a part of the bird. These feathers are cut from the extreme upper portions of natural feathers that are from ten to twelve inches long, in order to obtain maximum flexibility of the feather with minimum weight and thus, I am able to produce a bird having a greater degree of weight in the body thereof.

I prefer to cut the feathers so that the same have an approximate length of from three to three and one-eighth inches over-all, as such construction enables a substantial portion of the quill to be inserted in the wall 11 and, from the top or rear face of the wall 11 the quill with the feather portions thereof cut away extends rearwardly or upwardly for approximately seven-eighths of an inch.

Those portions of the quills of the feathers that are inserted in the wall 11 extend into the body 10 of the bird approximately an eighth or a quarter of an inch below or beyond the bottom of the recess or chamber that is surrounded by the wall 11.

The portions 14 of the feathers are preferably formed so that they are of elongated oval or almond shape and, when the ends of the quill portions of said feathers are inserted in the wall 11 the feather portions 14 are disposed so that they overlap each other, thereby forming a substantially circular wall that gradually increases in diameter toward its outer or rear end.

Due to the particular shape of the portions 14 of the feathers and the arrangement of such portions when said feathers are applied to the body of the bird, the spin of the bird after being struck and while in flight is not affected and further, there is no quivering of the bird during flight.

In cutting and giving shape to the feathers that are used in the bird, the barbs on that portion of the quill that is embedded in the wall 11 and body 10 are shaped so that they project slight distances from the quill, thus forming oppositely disposed short rows of barb portions 13a which, when embedded in the wall and body and secured thereto by cement or other adhesive, effectually anchors the feathers to the body and resists to a substantial degree strains and stresses that tend to pull the embedded portions of the feathers out of the body and wall.

In order to firmly secure the feathers to the elastic body of the bird, the ends of the quill portions 13 and barbs 13a thereon are, before being inserted into the body, coated with a suitable cement or adhesive and, to further secure the feathers to the body and to maintain the projecting portions of the feathers in proper relation, a thread 15 preferably of linen surrounds the quill portions of the feathers immediately adjacent the flat surface at the top or rear end of wall 11 and this thread is secured to the quill portions of the feathers and to the flat surface of the wall by cement or other adhesive.

In applying the tie 15 to the feathers, I prefer to wrap said tie twice around the circular row of feathers before securing its ends to each other and, during such operation the tie is drawn taut so as to slightly contract the size of the circle occupied by the row of feathers and, such action necessarily contracts to a certain degree the circumference of the wall 11, thereby putting the elastic material in said wall under compression and such action reduces the circumference of the circle occupied by the outer ends of the feathers.

In Fig. 1, dotted lines $x$ indicate the position of the feathers before the tie has been applied and drawn taut as just described and, solid lines show the positions of the feathers after the tying operation has been completed and the bird is ready for use.

This development of tension in the wall portion of the body materially increases the resiliency of the bird and imparts thereto the very desirable attribute of "speed" in play, due to the fact that the bird tends to return to its normal position more quickly than where a substantial portion of the sponge rubber body is not under constant tension due to the compression afforded by the tie.

The location of the thread 15 directly against the upper or rear flat face of the wall 11, locates the weight of said thread as near as possible to the center of gravity of the elastic body of the bird and, said thread in such position, does not offer any resistance to the air during the flight of the bird and which condition would exist if the thread were positioned on the quill portions of the feathers a short distance away from the end of the wall 11 of the body.

In anchoring the ends of the quill portions of the feathers in the body, I prefer to use a rubber cement which has a certain degree of elasticity and this permits the feathers to move from side to side in their sockets and return to their normal positions after the strains that tend to impart movement to the feathers have been removed.

In other words, the feathers are mounted in the resilient sponge rubber body of the bird in practically the same manner that feathers are embedded in the wings of fowl, wherein each feather has a flexible, yet firm anchorage in the wing structure.

In order to obtain the desired degree of compression imparted to the upper portion of the wall 11 of the body, a narrow strip of thin, flexible material 16, preferably fabric, such as a narrow ribbon or strip of silk, is secured on the outer face of the upper portion of the wall 11 after the same has been compressed, said thin, narrow strip being permanently secured to the wall of the body by the adhesive, such as cement.

After the tie 15 has been applied and secured around the feathers immediately adjacent the top of the wall of the body, the latter is dipped in rubber cement having a pure white pigment in order that said cement may coat the entire surface of the body 10 and the circumferential surface of the wall 11. After the cement has partially dried and become "tacky", the narrow, flexible strip of fabric 16 is applied to the outer upper face of the wall 11, with the ends of said strip overlapping approximately one-half inch. In applying the fabric strip, it is pulled tight upon the wall, but it should not increase the compression of the rubber in the wall beyond that degree produced by the application and fastening of the tie 15.

While the cement coating on the wall and body are still tacky, a pure white dusting powder is applied to said cement coated surface and, when the cement has become thoroughly dried the body of the bird is given a pure white color which adds materially to the appearance thereof. In order to increase the appearance of the bird, the fabric strip 16 that is secured to the upper outer portion of the wall by the rubber cement may be distinctively colored, for instance, red, blue, green, or the like.

An especially desirable feature of my invention is, that the over-all length of the feathers is less than that of the feathers used in the standard forms of birds now produced and on the market and, I have found by tests and experiments that this shortening of the feathers is effective in producing a stiffer cone of feathers without the necessity for stitching or tying the feathers to each other at a point above or to the rear of the body of the bird. By eliminating this stitching or tie, it is possible to produce a bird that will weigh approximately ten grains more than the conventional birds and this added weight is an advantage, due to the fact that the flight of the bird after being struck will be truer on account of its increased weight.

The reason that my improved bird does not travel farther than the standard bird in spite of the added weight, is due to the fact that when the bird receives a hard blow, the resulting added spin causes the cone of feathers to expand, thus stopping the bird within the boundary lines of the court on which the game is played.

Inasmuch as the body of the bird is composed of pure gum sponge rubber, it has a maximum degree of elasticity and therefore, the body will readily collapse if stepped upon and immediately return to its normal condition after the pressure on the body has been relieved and, in the event of breakage of the feathers the same may be easily and quickly removed from the elastic body and replaced by new feathers.

Thus it will be seen that I have provided a shuttlecock or bird that is relatively simple in construction, inexpensive of manufacture and very effective in performing the functions for which it is intended.

It will be understood that minor changes in the size, form and construction of the various parts of my improved shuttlecock, may be made and substituted for those herein shown and described, without departing from the spirit of my invention, the scope of which is set forth in the appended claims.

I claim as my invention:

1. A shuttlecock comprising a substantially hemi-spherical body composed of elastic material, an elastic circular wall formed integral with said body opposite its rounded face, a circular row of feathers having the ends of their quill portions inserted in said wall, a flexible tie surrounding the quill portions of said feathers immediately adjacent the end of said wall and which tie is secured to said wall.

2. A shuttlecock comprising a substantially hemi-spherical body of sponge rubber, a circular wall of sponge rubber formed integral with said hemi-spherical body of rubber opposite its rounded face and a series of feathers having the ends of their quill portions embedded in said wall and extending a substantial distance beyond said wall into said hemi-spherical body of sponge rubber.

3. A shuttlecock comprising a substantially cup-shaped body formed of sponge rubber, a plurality of feathers having their quill ends embedded in said body around the chamber therein and barbs on the embedded end portions of said feathers.

4. A shuttlecock as set forth in claim 3, with means attached to the top surface of said body and applied to said feathers immediately outwardly of the top surface of said body for maintaining that portion of the body in which the barbed ends of the feathers are embedded under compression.

5. A shuttlecock comprising a substantially cup-shaped body formed of sponge rubber, a plurality of feathers having their quill ends embedded in said body around the recess therein and means applied and permanently secured to the upper portion of the body around the recess therein for imparting and maintaining compression in that portion of the body in which the quills are embedded.

6. A shuttlecock comprising a substantially cup-shaped body formed of sponge rubber, a plurality of feathers having their quill ends embedded in said body around the recess therein, a tie carried by the top surface of said body and surrounding the quill portions of the feathers immediately outwardly of said surface for maintaining that portion of the body in which the quills are embedded under compression and a flexible member secured to and surrounding that portion of the body that is under compression.

7. The structure of claim 2, and barbs on the embedded end portions of said feathers.

8. A shuttlecock, comprising a substantially hemi-spherical sponge rubber body, an axially disposed recess formed in the flat surface of said body, a plurality of feathers having their quill ends embedded in said flat surface around said recess, the tips of said quill ends extending into said body a substantial distance below the floor of said recess, and means secured to said body and maintaining that portion of the body in which said quill portions are embedded under compression.

ATWOOD M. TIMPÉ.